UNITED STATES PATENT OFFICE.

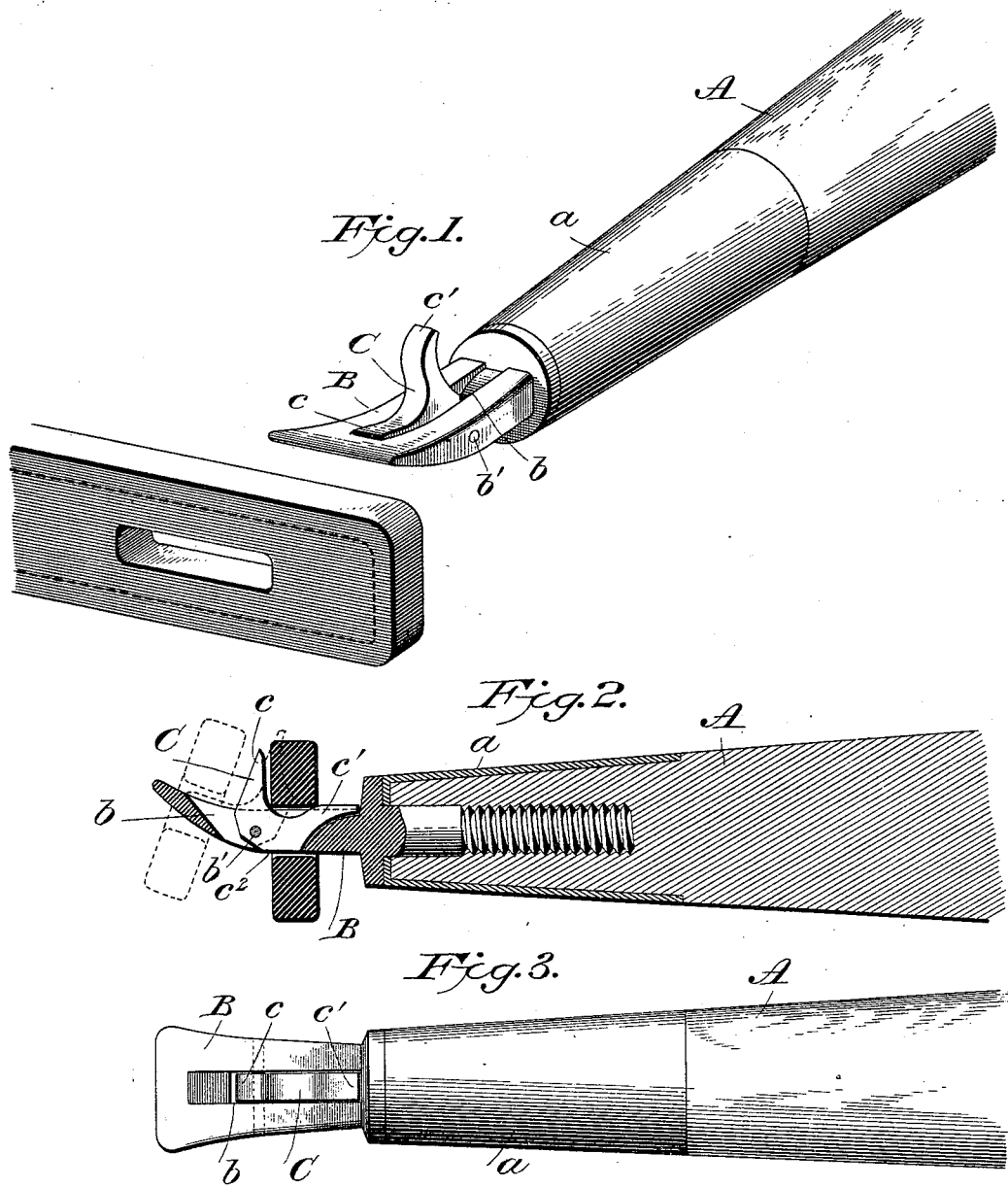

JACOB J. HARRIS, OF HIGHLAND, OHIO.

TRACE-FASTENER.

SPECIFICATION forming part of Letters Patent No. 582,859, dated May 18, 1897.

Application filed March 12, 1896. Serial No. 582,921. (No model.)

*To all whom it may concern:*

Be it known that I, JACOB J. HARRIS, a citizen of the United States of America, residing at Highland, in the county of Highland and State of Ohio, have invented certain new and useful Improvements in Trace-Fasteners; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in trace-fastenings or whiffletree-hooks and provides a very simple and effective attachment for the ordinary whiffletree-hook, whereby when the end of the trace is placed over the hook the attachment will retain the parts in positive connection, as in detaching a trace from a hook carrying my improved attachment the said trace will have to be slightly twisted to remove the same, as hereinafter fully set forth.

The invention consists in the peculiar construction of a dog or latch which is pivoted in a slot in the whiffletree-hook, the configuration of said dog or latch permitting of the ready attachment and detachment of the trace and at the same time prevents accidental detachment, as particularly set out in the claim.

In the accompanying drawings, forming part of this specification, Figure 1 is a perspective view of a whiffletree-hook with my attachment applied thereto, the trace being shown detached. Fig. 2 is a longitudinal vertical sectional view, and Fig. 3 is a plan view.

A designates the end portion of a whiffletree which is provided with the usual ferrule $a$, having an opening at its end through which the threaded end of the hook B passes in attaching the same rigidly to the whiffletree. The hook B is preferably provided with a shoulder, as shown, which bears against the end of the ferrule, and the projecting portion of this hook is curved slightly upward and tapered, while the sides thereof are flared outward. The hook B is also provided with a vertical slot $b$, the inner wall of which is curved in the segment of a circle, while the outer wall inclines upwardly and outwardly, and within this slot is pivoted a dog or latch C, having two upwardly-projecting members $c$ and $c'$, the lower edge of the member $c'$ being curved to bear upon the curved wall of the slot $b$ when the latch is in one position, the outer edge of the member $c$ being straight to contact with the inclined wall of the slot when said latch is in its other position. The lower part of the latch or dog C is provided with a straight edge $c^2$, the entire length of which is inward from the pivot-pin $b'$, as shown in Fig. 2.

In slipping the end of a trace over the hook provided with my improved latch or dog the trace is placed over the end of the hook, as shown in dotted lines, Fig. 2, and the lower part of said trace is forced inward. When the trace is attached, the parts are in the position shown in full lines, Fig. 2, and in this position accidental detachment is prevented. To detach the trace, the upper part of the same is forced outward, which will incline the lower wall of the slot therein and allow the dog to escape the same. It will be noted that in removing the trace the upper part of the latch or dog between the members $c$ and $c'$ thereof acts to separate the parts of said trace on each side of the slot therein, and thus provides a spring tendency which has to be overcome in separating the parts. This presents an additional security, so that the trace in wabbling from side to side will not be likely to throw the dog.

The device herein shown and described provides a very simple, cheap, and effective means for connecting or fastening the end of a trace to a whiffletree.

It will be noted that the whiffletree-hook is provided with a slot which extends through the same, and this open slot will not retain dirt, as any dirt that may enter the said slot will readily fall through. It will also be noted that the slot conforms to the shape of the latch or dog and that the pivot is located on a line with the member $c'$; also, that when the latch or dog is in position to retain the trace the lower edge lies flush with the lower edge of the hook, and when said dog or latch is turned upon its pivot the end portions thereof will extend above the hook. The latch or dog is also provided with an intermediate recess which extends below the upper edge of the hook, so that when the trace is in engagement it will lie in this recess, preventing both an outward and inward movement of the same, and also preventing the latch turning unless sufficient force is brought upon the trace to spread the slot thereof. It will be noted that the pivot-pin $b'$ is positioned between the end portions of the members $c$ and $c'$ of the latch or dog and that the configuration of the opening and under side of the latch is such that dirt or mud will not collect in said opening.

I am aware that prior to my invention it has been proposed to provide a trace-fastener for singletrees having a recess and a latch pivoted so as to swing outward and lie partially within said recess, the latch having a projection which prevents the displacement of the trace, as shown in the patent to D. T. Chambers, No. 357,368, dated February 8, 1887.

Having thus described my invention, I do not wish to limit myself to the application of the same to a whiffletree, as it is apparent the same device could be located at the end of a pole for fastening the holdback-strap thereto.

I claim—

A trace-fastener for whiffletrees, comprising a trace-hook having a threaded shank for engagement with the whiffletree, a collar beyond said shank, and a projecting portion beyond the collar which presents a flattened, slightly-upturned, and reduced end, an opening or slot which extends through the projecting portion, the end walls of said slot being beveled at an upward inclination; together with a latch having members $c$ and $c'$ the outer faces of which conform to the shape of the end walls of the slot, the adjacent faces of said members being at substantially right angles with each other, an intermediate recess, and a pivot-pin for the latch; the parts being constructed so that one member of the latch will lie within the slot when the same is turned in either direction upon its pivot, as shown and for the purpose set forth.

In testimony whereof I affix my signature in presence of two witnesses.

JACOB J. HARRIS.

Witnesses:
J. S. KERNS,
C. B. HORSMAN.